2,741,619

ALKYL 1-ALKYL-4-CYCLOHEXYLPIPERIDINE-4-CARBOXYLATES AND THEIR SYNTHESIS

Philip Lucas, Watertown, Mass., assignor to Sterling Drug Inc., New York, N. Y., a corporation of Delaware No Drawing. Application November 7, 1951,
Serial No. 255,325

9 Claims. (Cl. 260—294.3)

This invention relates to new piperidine compounds and to their synthesis. In particular, these piperidine compounds are lower alkyl 1-(lower alkyl)-4-cyclohexyl-piperidine-4-carboxylates and acid addition salts thereof.

The compounds of this invention have been found to possess useful pharmacological properties, such as analgesic activity.

The lower alkyl 1-(lower alkyl)-4-cyclohexylpiperidine-4-carboxylates, having the formula

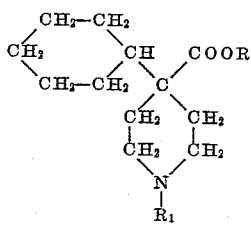

for the free base form, where R and $R_1$ are each lower alkyl radicals having preferably from 1 to 6 carbon atoms, inclusive, are prepared by heating a corresponding lower alkyl 1-(lower alkyl)-4-phenylpiperidine-4-carboxylate with hydrogen under pressure in the presence of a hydrogenation catalyst. Illustrative of this process is the formation of ethyl 1-methyl-4-cyclohexylpiperidine-4-carboxylate by heating ethyl 1-methyl-4-phenylpiperidine-4-carboxylate with hydrogen under pressure in the presence of Raney nickel.

The salts of my invention are prepared by treating the lower alkyl 1-(lower alkyl)-4-cyclohexylpiperidine-4-carboxylates in free base form with the appropriate acid. In practicing my invention, I found it convenient to employ the hydrochloride salt. However, other salts are within the scope of the invention. Included among other salts which may be used are the following, formed by reacting the basic piperidine compound with the appropriate relatively non-toxic inorganic or organic acid: the hydrobromide, hydroiodide, phosphate, sulfate, sulfamate, ethanesulfonate, tartrate, citrate, succinate, acetate, benzoate, oleate, and the like.

The following examples will further illustrate specific embodiments of my invention.

Examples

*Ethyl 1-methyl-4-cyclohexylpiperidine-4-carboxylate hydrochloride.*—A solution of 49.4 g. of ethyl 1-methyl-4-phenylpiperidine-4-carboxylate in 200 ml. of ethanol was treated at 170° C. with hydrogen under pressure (2300 lbs. per sq. in.) for fourteen hours in the presence of Raney nickel (10 g., moist with ethanol). The reaction mixture was cooled, the catalyst filtered off and the solvent removed from the filtrate by distilling in vacuo. The resulting residual material was triturated with ether, filtered and the ethereal filtrate was distilled in vacuo. After the ether had been removed, there was obtained a water-white, liquid fraction of 29 g., B. P. 102–105° C. at 0.3 mm. This distillate, ethyl 1-methyl-4-cyclohexylpiperidine-4-carboxylate, was dissolved in ether and the ethereal solution was treated with hydrogen chloride gas. The resulting precipitate was collected and recrystallized several times from dioxane, yielding the product, ethyl 1-methyl-4-cyclohexylpiperidine-4-carboxylate in the form of its hydrochloride, M. P. 213–214° C. (with decomposition) after having been dried at 100° C.

*Analysis.*—Calcd. for $C_{15}H_{27}NO_2 \cdot HCl$: C, 61.94; H, 9.36; N, 4.82. Found: C, 62.00; H, 9.59; N, 4.87.

Following the foregoing procedure but using methyl 1-n-hexyl-4-phenylpiperidine-4-carboxylate, isobutyl 1-isobutyl-4-phenylpiperidine-4-carboxylate or n-hexyl 1-ethyl-4-phenylpiperidine-4-carboxylate in place of ethyl 1-methyl-4-phenylpiperidine-4-carboxylate, there is obtained methyl 1-n-hexyl-4-cyclohexylpiperidine-4-carboxylate hydrochloride, isobutyl 1-isobutyl-4-cyclohexylpiperidine-4-carboxylate hydrochloride or n-hexyl 1-ethyl-4-cyclohexylpiperidine-4-carboxylate hydrochloride, respectively.

*Ethyl 1-methyl-4-cyclohexylpiperidine-4-carboxylate.*—A small quantity of ethyl 1-methyl-4-cyclohexylpiperidine-4-carboxylate hydrochloride, obtained above, was dissolved in water and the aqueous solution was treated with ammonium hydroxide. The resulting precipitate was filtered, washed with water and dried in vacuo over phosphorus pentoxide, yielding ethyl 1-methyl-4-cyclohexylpiperidine-4-carboxylate in free base form, M. P. 46–48° C.

*Analysis.*—Calcd. for $C_{15}H_{27}NO_2$: C, 71.09; H, 10.74. Found: C, 71.29; H, 10.30.

Following the foregoing procedure but using methyl 1-n-hexyl-4-cyclohexylpiperidine-4-carboxylate hydrochloride, isobutyl 1-isobutyl-4-cyclohexylpiperidine-4-carboxylate hydrochloride or n-hexyl 1-ethyl-4-cyclohexylpiperidine-4-carboxylate hydrochloride in place of ethyl 1-methyl-4-cyclohexylpiperidine-4-carboxylate hydrochloride, there is obtained the free base form of methyl 1-n-hexyl-4-cyclohexylpiperidine-4-carboxylate, isobutyl 1-isobutyl-4-cyclohexylpiperidine-4-carboxylate or n-hexyl 1-ethyl-4-cyclohexylpiperidine-4-carboxylate, respectively.

I claim:

1. A member of the group consisting of a compound having the formula

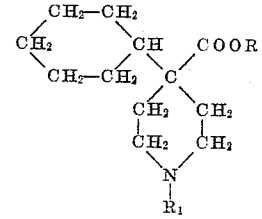

where R and $R_1$ are each lower alkyl radicals having 1 to 6 carbon atoms inclusive, and acid addition salts thereof.

2. A compound having the formula

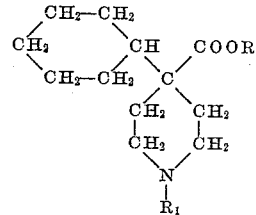

where R and $R_1$ are each lower alkyl radicals having 1 to 6 carbon atoms inclusive.

3. An acid addition salt of the compound of claim 2.
4. Ethyl 1-methyl-4-cyclohexylpiperidine-4-carboxylate.
5. An acid addition salt of ethyl 1-methyl-4-cyclohexylpiperidine-4-carboxylate.
6. Ethyl 1-methyl-4-cyclohexylpiperidine-4-carboxylate hydrochloride.

7. The process of preparing a compound having the formula

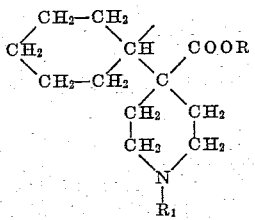

where R and R₁ are each lower alkyl radicals having 1 to 6 carbon atoms inclusive, which comprises heating the corresponding lower alkyl 1-(lower alkyl)-4-phenylpiperidine-4-carboxylate with hydrogen under pressure in the presence of a hydrogenation catalyst.

8. The process of preparing a compound having the formula

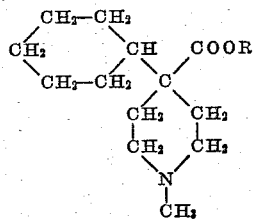

where R is a lower alkyl radical having from 1 to 6 carbon atoms inclusive, which comprises heating the corresponding lower alkyl 1-methyl-4-phenylpiperidine-4-carboxylate with hydrogen under pressure in the presence of a hydrogenation catalyst.

9. The process of preparing ethyl 1-methyl-4-cyclohexylpiperidine-4-carboxylate which comprises heating ethyl 1-methyl-4-phenylpiperidine-4-carboxylate with hydrogen under pressure in the presence of Raney nickel.

References Cited in the file of this patent
UNITED STATES PATENTS

| | | |
|---|---|---|
| 2,498,434 | Lee | Feb. 21, 1950 |
| 2,585,210 | Albertson | Feb. 12, 1952 |

OTHER REFERENCES

P. B. 981, p. 87 (1945).